United States Patent
Xiao et al.

(10) Patent No.: US 10,091,188 B2
(45) Date of Patent: Oct. 2, 2018

(54) ACCELERATED PASSPHRASE VERIFICATION

(71) Applicant: QUALCOMM Incorporated, San Diego, CA (US)

(72) Inventors: Lu Xiao, San Diego, CA (US); Satyajit Patne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/673,561

(22) Filed: Mar. 30, 2015

(65) Prior Publication Data

US 2016/0294802 A1 Oct. 6, 2016

(51) Int. Cl.
H04L 29/06 (2006.01)
G06F 21/31 (2013.01)
H04L 9/32 (2006.01)

(52) U.S. Cl.
CPC ............ *H04L 63/083* (2013.01); *G06F 21/31* (2013.01); *H04L 9/3226* (2013.01); *G06F 2221/2103* (2013.01); *G06F 2221/2111* (2013.01)

(58) Field of Classification Search
CPC .................................... H04L 63/083
USPC .............................................. 726/6
See application file for complete search history.

(56) References Cited

U.S. PATENT DOCUMENTS

| | | | |
|---|---|---|---|
| 8,386,461 B2 | 2/2013 | Bachmann | |
| 8,745,695 B2 | 6/2014 | Newman et al. | |
| 8,832,807 B1 | 9/2014 | Kuo et al. | |
| 8,869,305 B1 * | 10/2014 | Huang | G06F 21/604 380/258 |
| 8,925,062 B1 | 12/2014 | Brezinski et al. | |
| 2004/0172535 A1 * | 9/2004 | Jakobsson | G06Q 20/341 713/168 |
| 2006/0041759 A1 | 2/2006 | Kaliski et al. | |
| 2008/0072320 A1 * | 3/2008 | Hurley | G06F 21/46 726/21 |
| 2008/0313721 A1 * | 12/2008 | Corella | G06F 21/31 726/6 |
| 2012/0110498 A1 | 5/2012 | Mclean | |

(Continued)

OTHER PUBLICATIONS crackstation.net. (Mar. 18, 2015). Secure Salted Password Hashing—How to do it Properly. XP55278555. Retrieved from the Internet: URL: https://web.archive.org/web/20150318050622/https://crackstation.net/hashing-security.htm, [retrieved on Jun. 7, 2016] the whole document.

(Continued)

*Primary Examiner* — Peter C Shaw
(74) *Attorney, Agent, or Firm* — Hunter Clark PLLC

(57) ABSTRACT

Systems and methods for providing accelerated passphrase verification are disclosed. In one embodiment, a method includes receiving a full security string, generating a full security string hash code, storing the full security string hash code in a memory, determining at least one substring based on an entropy value associated with one or more leading characters in the full security string, generating at least one substring hash code and at least one corresponding character count value, such that the corresponding character count value equals a number of characters in the at least one substring, and storing the at least one substring hash code and the at least one corresponding character count value in the memory.

16 Claims, 10 Drawing Sheets

(56) References Cited

U.S. PATENT DOCUMENTS

| | | | |
|---|---|---|---|
| 2012/0284783 A1 | 11/2012 | Jakobsson | |
| 2013/0298223 A1* | 11/2013 | Li | G06F 21/46 726/18 |
| 2013/0326611 A1* | 12/2013 | Gargi | G06F 21/31 726/16 |
| 2014/0047521 A1 | 2/2014 | Henderson et al. | |
| 2014/0181922 A1 | 6/2014 | Jakobsson | |
| 2014/0189885 A1* | 7/2014 | Golan | G06F 21/32 726/28 |
| 2014/0215601 A1 | 7/2014 | Rittle et al. | |
| 2015/0227728 A1* | 8/2015 | Grigg | G06F 21/31 726/4 |
| 2015/0254444 A1* | 9/2015 | Herger | G06F 21/32 726/19 |
| 2016/0314308 A1* | 10/2016 | Suzuki | H04M 1/72577 |

OTHER PUBLICATIONS

Aspinal, D., & Just, M. (Apr. 1, 2013). Give Me Letters 2, 3 and 6! Partial Password Implementations and Attacks. Correct System Design, Lecture Notes in Computer Science, vol. 7859, pp. 126-143. Springer International Publishing. ISSN: 0302-9743, ISBN: 978-3-642-34221-9, XP047037683.

Partial International Search Report—PCT/US2016/022564—ISA/EPO—dated Jun. 20, 2016—9 pgs.

International Search Report and Written Opinion—PCT/US2016/022564—ISA/EPO—dated Sep. 7, 2016—22 pgs.

International Preliminary Report on Patentability—PCT/US2016/022564, The International Bureau of WIPO—Geneva, Switzerland, dated Mar. 20, 2017.

European Search Report—EP17199146—Search Authority—The Hague—dated Feb. 15, 2018.

\* cited by examiner

ACCELERATED PASSPHRASE VERIFICATION

BACKGROUND

There is a desire by service providers and consumers to distribute high-quality digitally encoded content (e.g., data, voice, and video) to both stationary and mobile device. Access to content is often restricted and users may be required to provide security credentials. Credentials such as passwords, passphrases, pattern verification, gestures and other user input may be used in security critical use cases. A credential may be composed of multiple characters such as strings consisting of letters, words, numbers, symbols, gestures, or other user input. In general, a credential with more characters is more secure than a short password.

In an effort to increase security within a computer network, a computer operating system may support passphrases up to 256 characters. It is often not convenient, however, for a user to key in a long passphrase especially if a mobile device with a small touch screen is being used. Lengthy passphrases may be replaced with a separate, and usually shorter, password. A shorter password, however, may have other issues. For example, easy passwords are weak while strong passwords are hard to remember. Moreover, certain client side application may have both a PC version and a mobile phone version to talk to the same server which is passphrase enforced. If a passphrase is enforced in the PC version, it is often hard to relax the requirements in the mobile version through use of a shorter password.

SUMMARY

An example method for validating a user's security credentials on a computing device according to the disclosure includes creating a user account on a server including a userID value and a full security string, such that the full security string begins with a first character, and accessing the user account by providing the userID value and a substring, such that the substring includes a subset of consecutive characters in the full security string beginning with the first character.

An example method for verifying an access request received from a client according to the disclosure includes receiving the access request from the client, such that the access request includes a user identification, determining a character count value based at least in part on the user identification, providing the character count value to the client, receiving a substring from the client, such that a length of the substring corresponds to the character count value, verifying the substring, granting the access request if the substring is valid, and denying the access request if the substring in invalid.

Implementations of such a method may include one or more of the following features. Receiving a context information, and determining the character count value based at least in part on the user identification and the context information. The context information may include a current location of the client. The context information may include a time the access request is received. Verifying the substring may include determining a substring hash code for the substring. A salt value based may be determined at least in part on the user identification, and the substring may be combined with the salt value, such that the substring hash code is determined for the combination of the substring and the salt value. Determining the character count value may include using the user identification to query an access control database, such that the access control database is a data structure include user identifications, hash codes and character count values.

An example apparatus according to the disclosure includes a memory, at least one processor operationally coupled to the memory and configured to receive a full security string, generate a full security string hash code, store the full security string hash code in the memory, determine at least one substring based on an entropy value associated with one or more leading characters in the full security string, generate at least one substring hash code and at least one corresponding character count value, such that the corresponding character count value equals a number of characters in the at least one substring, and store the at least one substring hash code and the at least one corresponding character count value in the memory.

Implementations of such an apparatus may include one or more of the following features. A first salt value may be generated and combined with the full security string to generate the full security string hash code. A second salt value may be generated and combined with a substring to generate a substring hash code. The full security string may be persistent data corresponding to gesture inputs. Generating the full security hash code may include performing a cryptographic hash on the full security string. Generating at least one substring hash code may include performing a cryptographic hash on the at least one substring. The entropy value for the substring is evaluated as a complexity level of at least a strong level.

An example of an apparatus according to the disclosure includes a memory, at least one processor operationally coupled to the memory and configured to create a user account on a server including a userID value and a full security string, such that the full security string begins with a first character, and access the user account by providing the userID value and a substring, wherein the substring includes a subset of consecutive characters in the full security string beginning with the first character.

Implementations of such an apparatus may include one or more of the following features. A character count value may be received from the server after providing the userID value. A context information for the apparatus may be determined, and the user account may be accessed by providing the context information, the userID value, and the substring. The character count value may be received from the server after providing the userID value and the context information. The context information may include a current location of the apparatus and/or a current time.

Items and/or techniques described herein may provide one or more of the following capabilities, as well as other capabilities not mentioned. A user account is created on a system. The system may be a local device or part of a network. The user account includes user identification information (e.g., a userID) and a full security string. The full security string may include characters, gestures, pattern verification, or other user input. A hash code corresponding to the full security string is stored. A salt value may be used together with the security string to form the input of the hash function. A complexity score (e.g., strength value) of the full security string is determined. An off the shelf algorithm may be used to evaluate the complexity (i.e., strength) of a string. For example, the strength measurement may be based on the entropy of the string. A substring consisting of the first 'x' characters of the full security string is determined. The strength of the substring is evaluated. The value of 'x' is variable based on the corresponding complexity (i.e., strength) of the substring. A hash code corresponding to the substring (and an optional salt value) is stored. Multiple substrings may be evaluated and their corresponding hash codes may be stored. A user's credentials are validated based on a substring. That is, user verification is accomplished with only the first 'x' characters of the full security string. A context associated with the user may be determined. The context may be based on a current location, ambient noise, behavioral and/or history data. A substring may be determined based on the context. A system security policy may establish when verification requires input of the full security string or the input of a substring. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect

DETAILED DESCRIPTION

Techniques are discussed for accelerating a user verification process. A user may provide a lengthy security credential (e.g., string, password, passphrase) to a network server. The strength of the first 'x' characters in the security credential may be evaluated. For example, the first 6 to 8 characters of the lengthy security credential may have sufficient entropy to serve as an acceptable credential. Since the credential is effectively strong enough with only 6 to 8 characters, the subsequent characters in the lengthy security credential may be skipped to improve the user experience (i.e., the user will not have to enter the additional characters). A system which utilizes accelerated credential verification may evaluate the strength of an input credential with first 'x' characters until sufficient strength (i.e., entropy) is obtained. The system may store a first hash of the first 'x' characters as well as the hash of full lengthy security credential, and password verification may be accomplished with only first 'x' characters or the full lengthy security credential based on specific security policy. The security policy can be a default setting, a user selection during setup, real time monitoring of location/behavior, or other context. In operation, a user need only remember the original credential (e.g., passphrase). The value of 'x' (i.e., the number of characters to be entered to obtain sufficient entropy) may not be known by the user. That is, the software may determine the value 'x' during credential setup. The value of 'x' may vary based on context (e.g., in a public or private area). The value 'x' may be stored together with multiple hashes. For example, a first hash (i.e., for the first 'x' characters) and second hash (i.e., for the entire lengthy credential) are both stored for the same userID. It is required that 'x' at least should allow for acceptable level of entropy. Each original security string may have its specific value of 'x' depending on entropy evaluation. The hash may contain salting mechanisms internally in order to frustrate dictionary attacks, i.e., hash (passphrase)=SHA-256 (salt∥passphrase) where "∥" denotes string concatenation. Upon verification of the first 'x' characters, a User Interface (UI) may skip the subsequent user input collection and notify the user about verification success.

Figure 1:
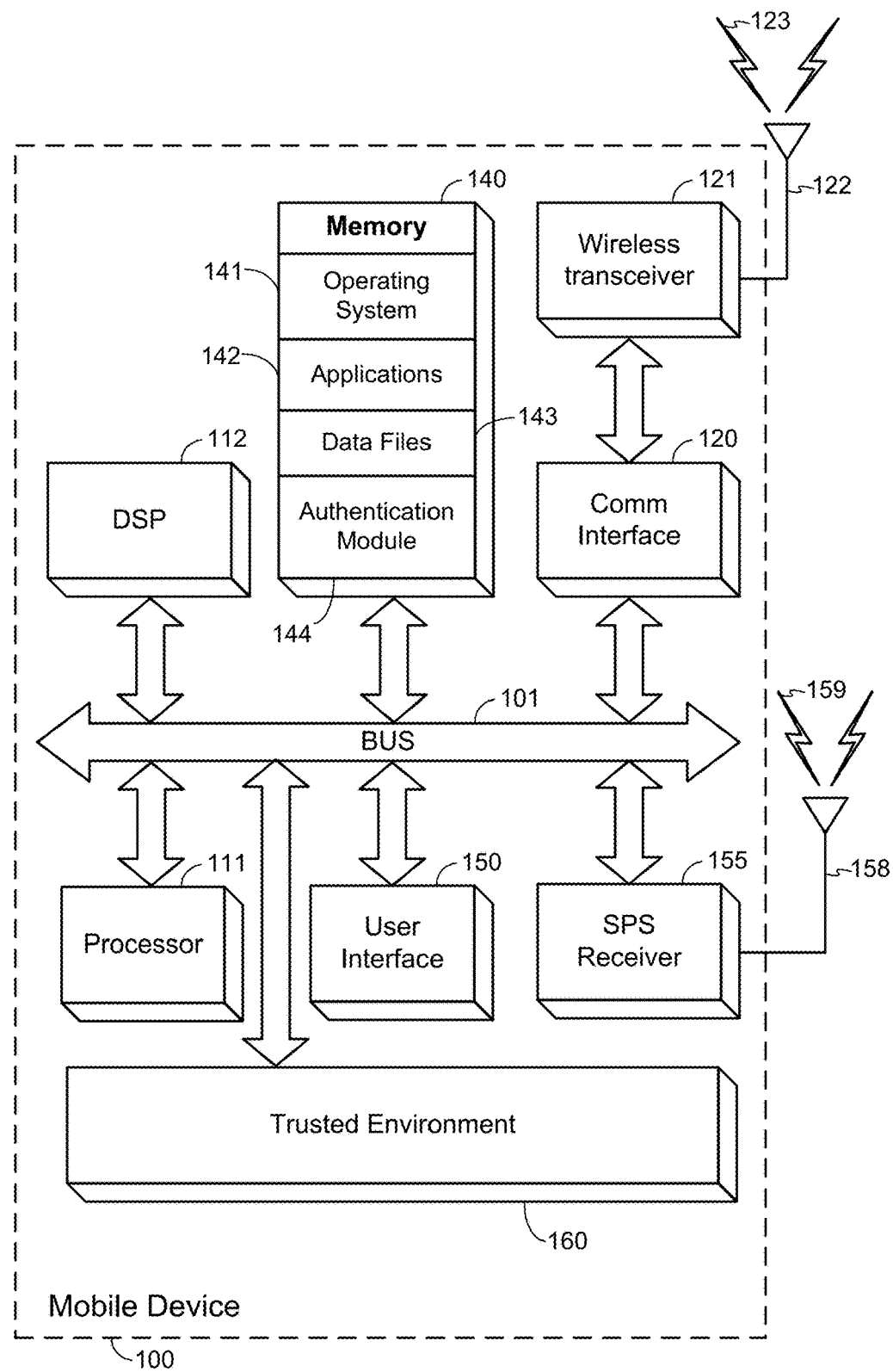
FIG. 1 is a block diagram of components of one embodiment of a mobile device.

Referring to FIG. 1, a mobile device 100 is illustrated for which various techniques herein can be utilized. The mobile device 100 can include or implement the functionality of various mobile communication and/or computing devices; examples include, but are not limited to, personal digital assistants (PDAs), smartphones, computing devices such as laptops, desktops or tablet computers, automobile computing systems, etc., whether presently existing or developed in the future.

The mobile device 100 includes a processor 111 (or processor core) and memory 140. The mobile device may optionally include a trusted environment 160 operably connected to the memory 140 by the public bus 101 or a private bus (not shown). The trusted environment 160 may include a Trusted Execution Environment (TEE) such as the ARM TrustZone® technology which may be integrated into the processor 111. The mobile device 100 may also include a communication interface 120 and a wireless transceiver 121 configured to send and receive wireless signals 123 via a wireless antenna 122 over a wireless network. The wireless transceiver 121 is connected to a bus 101. Here, the mobile device 100 is illustrated as having a single wireless transceiver 121. However, a mobile device 100 can alternatively have multiple wireless transceivers 121 and wireless antennas 122 to support multiple communication standards such as Wi-Fi, CDMA, Wideband CDMA (WCDMA), Long Term Evolution (LTE), BLUETOOTH short-range wireless communication technology, etc.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 also includes a user interface 150 (e.g., display, GUI), and an SPS receiver 155 that receives satellite positioning system (SPS) signals 159 (e.g., from SPS satellites) via an SPS antenna 158. The SPS receiver 155 can communicate with a single global navigation satellite system (GNSS) or multiple such systems. A GNSS can include, but are not limited to, Global Positioning System (GPS), Galileo, Glonass, Beidou (Compass), etc. SPS satellites are also referred to as satellites, space vehicles (SVs), etc. The SPS receiver 155 processes, in whole or in part, the SPS signals 159 and uses these SPS signals 159 to determine the location of the mobile device 100. The processor 111, memory 140, DSP 112 and/or specialized processor(s) (not shown) may also be utilized to process the SPS signals 159, in whole or in part, and/or to calculate the location of the mobile device 100, in conjunction with SPS receiver 155. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the mobile device 100. The processor 111 and DSP 112 associated with the mobile device 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. The memory may include code for an operating system 141, applications 142, data files 143 and an authentication module 144. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the mobile device 100 may be performed in whole or in part in hardware.

A mobile device 100 can estimate its current position within an associated system using various techniques, based on other communication entities within view and/or information available to the mobile device 100. For instance, a mobile device 100 can estimate its position using information obtained from access points (APs) associated with one or more wireless local area networks (LANs), personal area networks (PANs) utilizing a short-range wireless communication technology such as BLUETOOTH or ZIGBEE®, etc., SPS satellites, and/or map constraint data obtained from a map server or LCI server.

Figure 2:
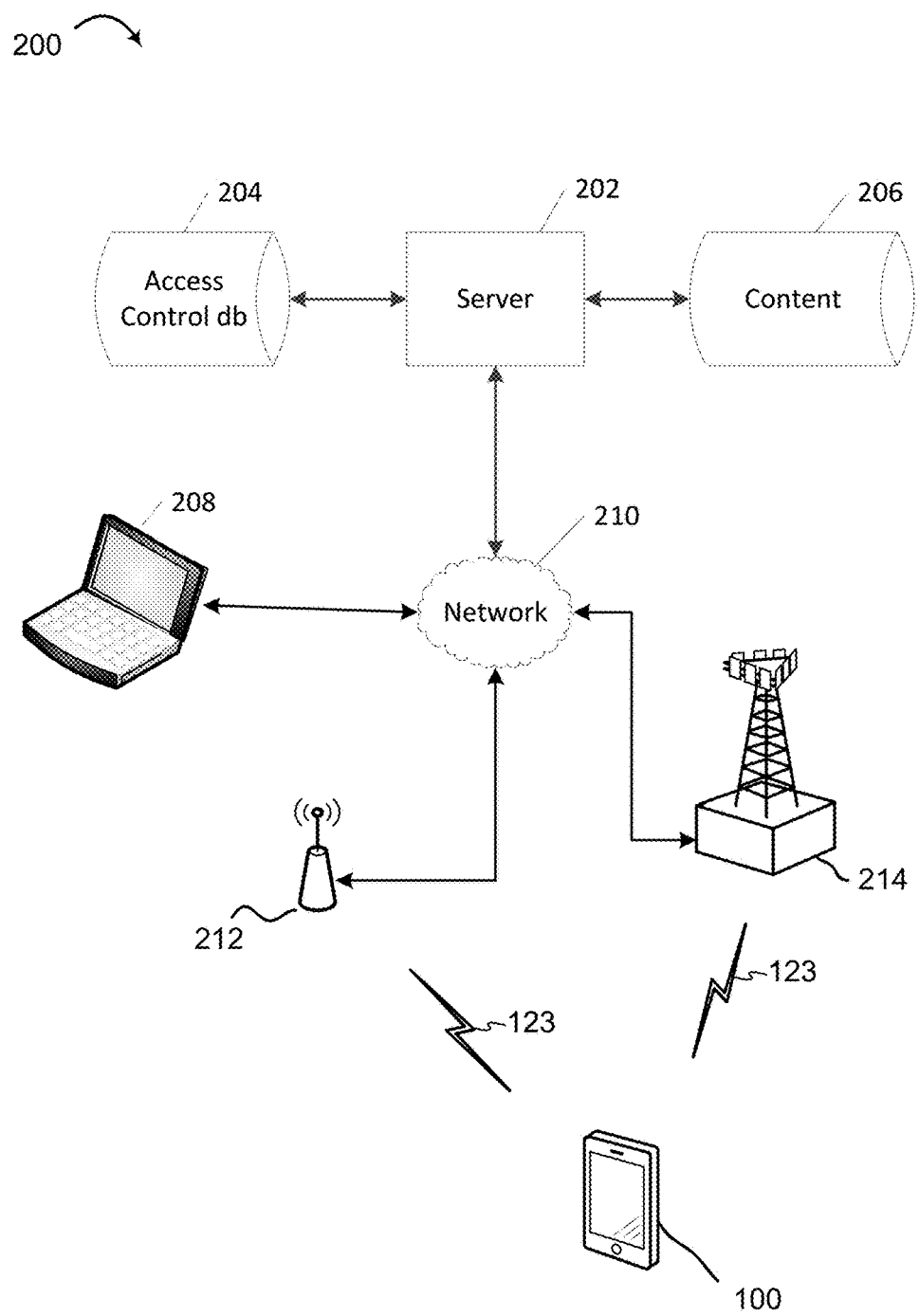
FIG. 2 is a block diagram of an example networked system.

Referring next to FIG. 2, a block diagram of an example networked computer system 200 in is shown. The networked computer system 200 includes multiple data processing devices such as a mobile device 100 and a personal computer 208. The data processing devices may be any suitable electronic device capable of receiving user credentials (e.g., a notebook computer, a tablet computer, a netbook, a mobile phone, a gaming console, an Automatic Teller Machine (ATM), a kiosk, a personal digital assistant (PDA), etc. . . . ). The networked computer system 200 may also include one or more access points 212 and/or base stations 214 configured to communicate with data processing devices and to enable connection with one or more networks 210. For example, the network 210 may be a Wide Area Network (WAN) and/or a Wireless Local Area Network (WLAN) and may further include a connection to the Internet. The access point 212 may be an advanced WLAN access point and the base station 214 may include an electronic switching function and may be configured as a Media Gateway (MGW) or Gateway Media Switching Center Server (GMSC).

The network 210 may provide connection to one or more servers 202. The server 202 is a data processing device including a processor and a memory, and is configured to execute computer executable instructions. For example, a server 202 may comprise a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The server 202 may store (e.g., in the memory) processor-readable, processor-executable software code containing instructions for controlling the processor to perform functions described herein. The functions assist in the accelerated credential verification on one or more data processing devices. The functions may include, for example, receiving security strings, determining the strength of the security strings and corresponding substrings, generating cryptographically secure pseudo-random numbers, generating and storing cryptographic functions (e.g., hash codes), determining character count information, evaluating user context data, and validating data access requests. The software can be loaded onto the memory by being downloaded via a network connection, uploaded from a disk, etc. Further, the software may not be directly executable, e.g., requiring compiling before execution. The server 202 may include an access control database 204 (e.g., data structure, relational database, flat files) to store security credential information. The server 202 may also include content database 206 including digitally encoded content (e.g., data, voice, and video) which may be provided to a user. The configuration of the server 202, the access control database 204, and content database 206 are exemplary only, and not a limitation. More than one server and database may be used.

Figure 3:
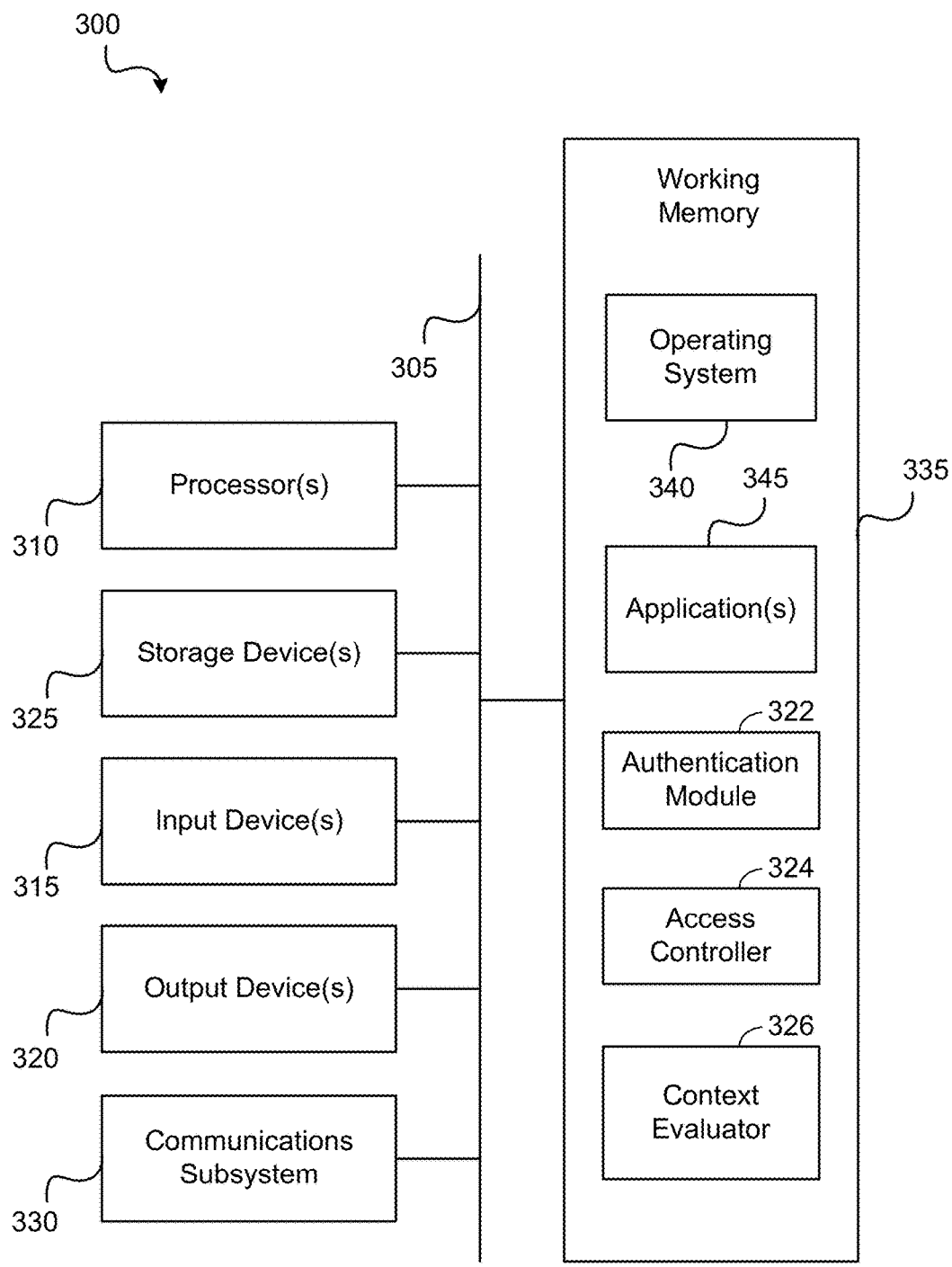
FIG. 3 is a block diagram of an example of a computer system.

A computer system 300 as illustrated in FIG. 3 may be utilized to at least partially implement the functionality of the server 202. FIG. 3 provides a schematic illustration of one embodiment of a computer system 300 that can perform the methods provided by various other embodiments, as described herein, and/or can function as a mobile device or other computer system. FIG. 3 provides a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like. The processor(s) 310 can include, for example, intelligent hardware devices, e.g., a central processing unit (CPU) such as those made by Intel® Corporation or AMD®, a microcontroller, an ASIC, etc. Other processor types could also be utilized.

The computer system 300 may further include (and/or be in communication with) one or more non-transitory storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infrared communication device, a wireless communication device and/or chipset (such as a BLUETOOTH short-range wireless communication technology transceiver/device, an 802.11 device, a WiFi device, a WiMax device, cellular communication facilities, etc.), and/or the like. The communications subsystem 330 may permit data to be exchanged with a network (such as the network described below, to name one example), other computer systems, and/or any other devices described herein. In many embodiments, the computer system 300 will further comprise, as here, a working memory 335, which can include a RAM or ROM device, as described above.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). For instance, as shown in FIG. 3, an authentication module 322, access controller 324, context evaluator 326, and/or other functional modules described herein could be implemented via the computer system 300 via processor-executable software code executed from the working memory 335 via the processor(s) 310. Such code and/or instructions can be used to configure and/or adapt a general purpose computer (or other device) to perform one or more operations in accordance with the described methods.

A set of these instructions and/or code might be stored on a computer-readable storage medium, such as the storage device(s) 325 described above. In some cases, the storage medium might be incorporated within a computer system, such as the computer system 300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

Figure 4:
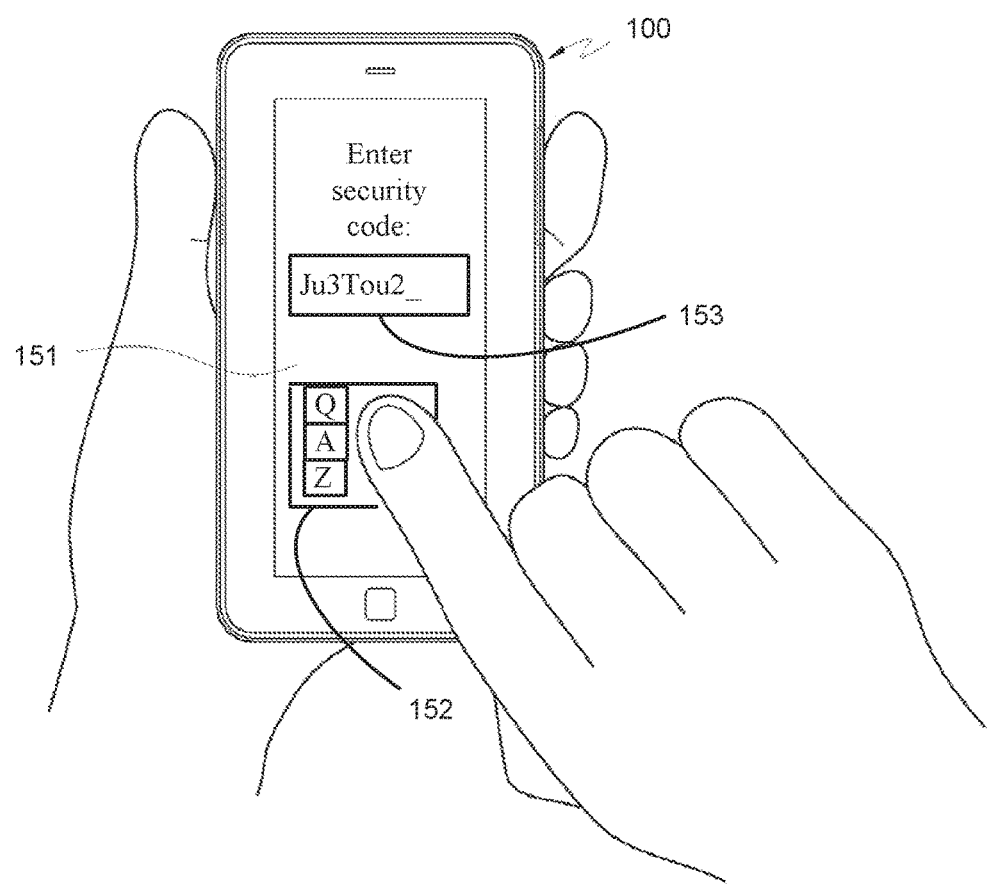
FIG. 4 is an illustration of a user providing security credentials on a mobile device.

Referring to FIG. 4, an illustration of a user providing security credentials on a mobile device is shown. The mobile device 100 includes a touch screen display 151 with a programmable keyboard 152 as a data entry device, and a text box object 153 as a visual feedback mechanism. The display 151, keyboard 152, and text box object 153 are exemplary only, and not a limitation, as other data entry and display devices/objects may be used. In operation, a user may be prompted to enter a security code such as a password, passphrase, gestures, or other information into an application executing on the mobile device 100. In an example, the mobile device 100 is part of a networked computer system 200, and the user is attempting to access network content (i.e., the content database 206). The user may have previously established an account on the system 200, or may have reset their account information, and provided a security credential at the respective time. In a subsequent attempt to access the system, the user is prompted to enter the security credential on the keyboard 152. After entering 'x' number of characters of the security credential (where 'x' is fewer characters then the complete security credential), the user is granted access to the desired content. Thus, the verification process is accelerated because the user does not have to enter the entire security credential. The user does not necessarily know the value of 'x,' and the value of 'x' may vary based on the characters in the security credential. In an embodiment, the value of 'x' may change based on the context in which the mobile device 100 is being used. The characters in the text box object 153 are shown as a demonstration only and may be displayed as a generic symbol (e.g., a dot, an asterisk, etc. . . . ) to help preserve the integrity of the security credential.

Figure 5A:
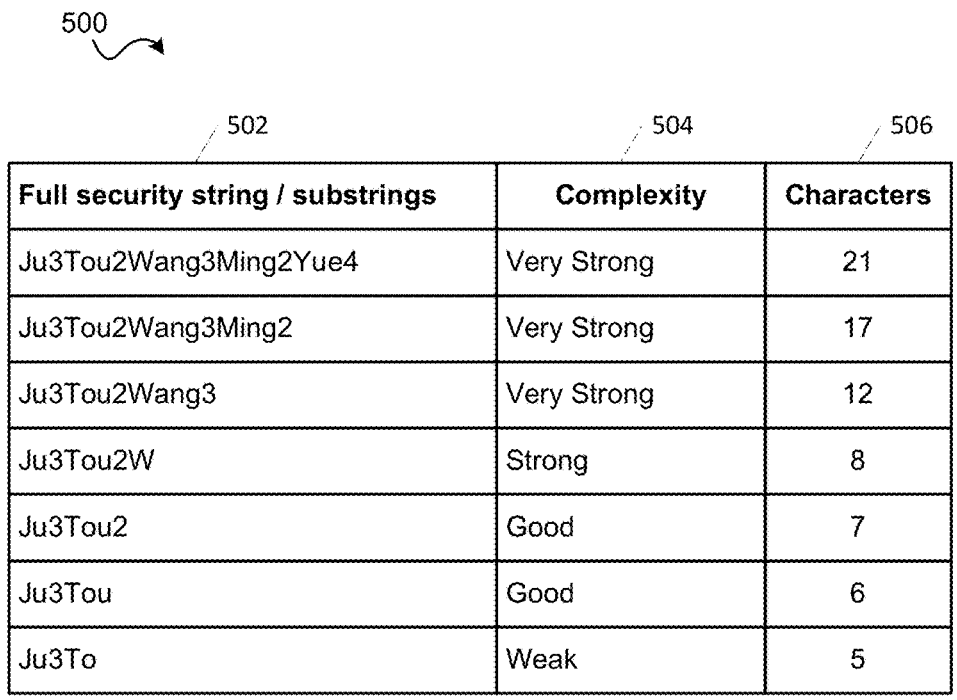
FIG. 5A is a table including a full security string and corresponding substrings.
Figure 5B:
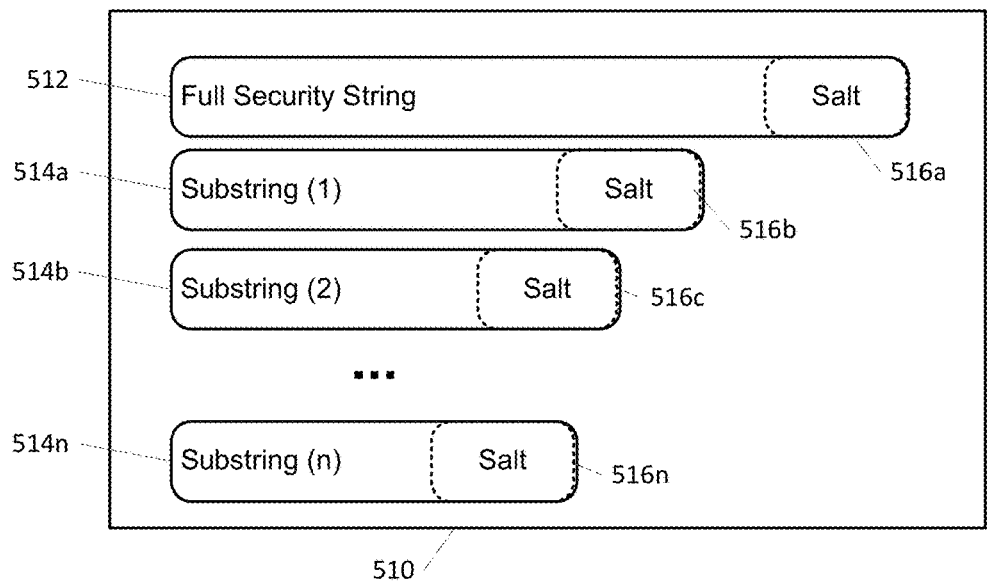
FIG. 5B is a collection of strings with optional salt values.

Referring to FIGS. 5A and 5B, with further references to FIGS. 1, 2 and 4, a table 500 including a full security string and corresponding substrings are shown. The table 500 includes a full security string/substrings column 502, a complexity column 504 and a characters column 506. The fields in the full security string/substrings column 502 are examples of a full security string and six substrings utilizing a different number of characters from the full security string. The characters column 506 indicates the respective number of characters in each of the full security string and the substrings (e.g., the first 'x' characters). The complexity column 504 represents the results of a password strength algorithm on the respective strings. A password strength algorithm is configured to measure the entropy of a string. As an example, and not a limitation, the password strength algorithm may be found at www.passwordmeter.com. Other password strength and/or entropy measuring algorithms may also be used. Referring to FIG. 5B, a user account may be associated with a collection of security strings 510 including the full security string 512, a first substring 514a, a second substring 514b, and any number of additional substrings indicated as an $n^{th}$ substring 514n. Each of the strings in the collection of strings may be combined with an optional salt value prior to hashing the string value. For example, the full security string 512 may be appended with a first salt value 516a, the first substring 514a may be appended with a second salt value 516b, the second substring 514b may be appended with a third salt value 516c, and so on such that the $n^{th}$ substring 514n may be salted with an $n^{th}$ salt value 516n. Each salt value is typically generated using a cryptographically secure pseudo-random number generator (CSPRNG), but other values for the salts may be used based on a security plan or other hardware considerations. The salt is added to the string in an effort to frustrate dictionary attacks. The salt may be prepended to the beginning (i.e., before) or appended at the end (i.e., after) the character string prior to saving the string as a hash code. For example, the collection of strings 510, and the corresponding salts, may each be transformed via a cryptographic hashing function (e.g., SHA256, SHA512, SHA3, etc. . . . ) and the resulting hash code may be stored on the access control database 204 along with the corresponding value from the character count column 506. In an embodiment, one or more of the salts and the resulting hash codes may be stored in the trusted environment 160 for local user verification. The authentication module 144 is configured to retrieve a salt value from the trusted environment 160, salt the data provided to the text box object 153, perform a hashing function on the salted sting, and compare the results to the hash codes stored in the trusted environment.

Figure 6:
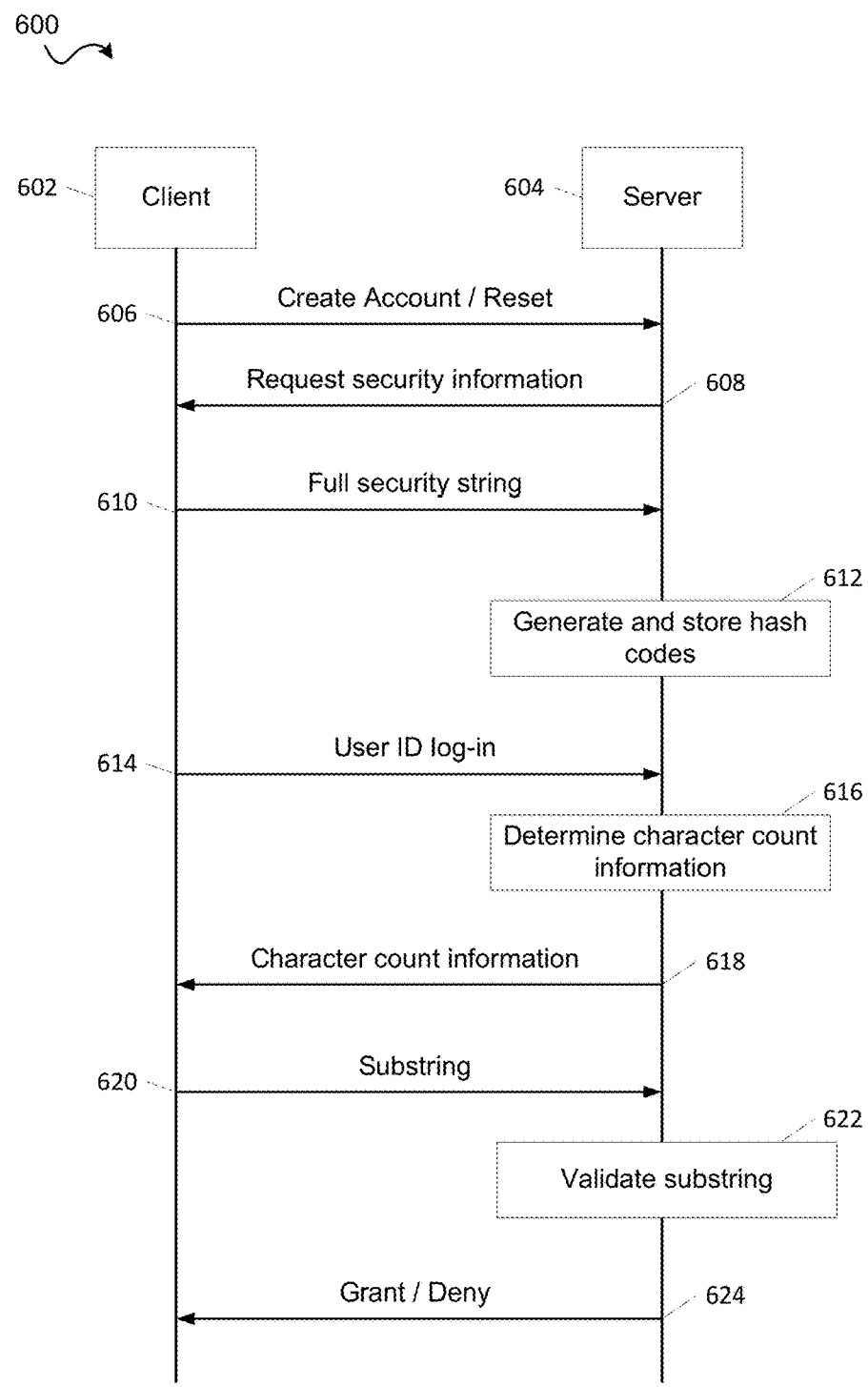
FIG. 6 is a flow diagram of an example client-server message flow.

Referring to FIG. 6, with further references to FIGS. 1-5, a flow diagram 600 of an example client-server message flow is shown. The flow diagram 600 illustrates example messages flowing between a client 602 and a server 604. The client 602 may be the mobile device 100, and the server 604 may be the server 202, and the respective example message may be transmitted via the network 210 and the wireless signals 123. The messages may be exchanged via a secure internet protocol such as Secure Sockets Layer (SSL) or Hypertext Transfer Protocol Secure (HTTPS). A user may utilize the client 602 to create an account on the server 604 and may provide log-in information such as a userID to identify their account. A similar process may occur for a user who had previously established an account on the server 604 (including a previous userID), but must reset their security credentials. One or more create account messages 606 may be exchanged with the server 604. In response, a request security information message 608 may be sent from the server to prompt the user to provide a full security string. A full security string message 610 will include a lengthy password, passphrase, series of gestures, or other information the user wishes to utilize as a security credential to validate an account access request. At stage 612, the server 604 is configured to generate and store a hash code for the full security string. The server 604 will evaluate the security strength of one or more substrings (i.e., the first 'x' characters of the full security string), and generate and store the respective substring hash codes and the corresponding character counts (i.e., the 'x' values). The hash codes may be associated with the user via the userID or other indexing information.

On a subsequent log-in attempt, the user may provide a user ID log-in message 614, which includes their userID or other identifying information. At stage 616, the server 604 is configured to determine which of the previously determined substrings to use for an accelerated verification. The selection of the substring may be based on a current context such as the location of the mobile device, a current time, or other considerations. In an embodiment, only one substring is stored for each full security string. The number of characters associated with the substring is determined (e.g., retrieved from the access control database 204) and that number value is provided to the client 602 via a character count information message 618. The client 602 is configured to prompt the user to enter the full security string and count each character as it is entered by the user. The user is not aware of the number value in the character count information message 618. When the number of characters entered by the user equals the value provided in the character count information message 618, the client 602 is configured to provide the entered characters (i.e., the substring) to the server 604 via a substring message 620. The user is unaware of the substring message 620 exchange. At stage 622, the server 604 is configured to validate the substring received in the substring message 620. The validation includes generating a hash code for the received substring and comparing the resulting hash code to the previously stored hash codes in the access control database 204. Salt values may also be used as previously described. Based on the results of the validation, one or more grant/deny messages 624 are provided to the client 602. If the validation is successful, the user is provided access to their account without entering their entire full security string. Since the substring message 620 is transmitted without the user's knowledge, the effect to the user is an accelerated verification process. If the validation process at stage 622 fails, the grant/deny message 624 may indicate to the user that access to the account is denied and the server 604 may record a failed access attempt.

Figure 7:
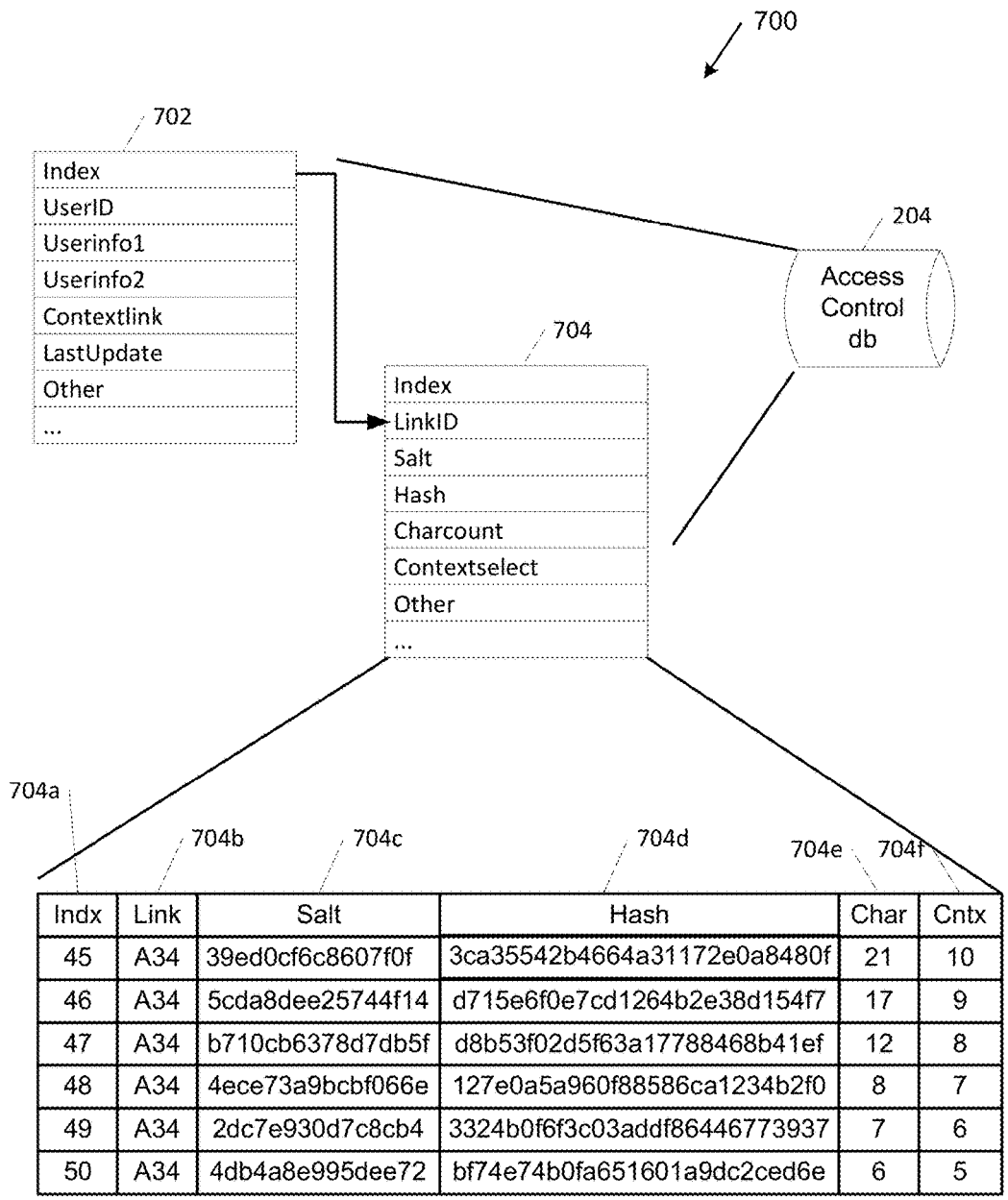
FIG. 7 is an example of a data structure for use with accelerated passphrase verification.

Referring to FIG. 7, with further reference to FIGS. 2 and 5, an example data structure 700 for for use with accelerated passphrase verification is shown. The data structure 700 is exemplary only and not a limitation as additional tables, fields, indices, and relationships may be used. The data structure 700 can persist in the server 202, or other storage devices on the network 210, and can include one or more databases such as the access control database 204, and the content database 206. The databases 204, 206 may be one or more relational databases with a collection of tables. Some or all of the data within databases 204, 206 may also be stored on the mobile device 100. The databases 204, 206 can include one or more tables 702, 704 containing data fields relating to user accounts and log-in validation. The data fields can be of data types as known in the art (e.g., number, char, varchar, date, etc. . . . ). The information included in the access control database 204 may include an account table 702 including multiple fields to represent a user account, such as a UserID, and user information such as contact information, billing information, security questions, etc. . . . (e.g., Userinfo1, Userinfo 2, etc. . . . ). A user account may be linked to a context database (e.g., Contextlink) for the purposes of associating a current context with the user. The context may be based on position information, ambient sounds, user behavior, and use history data files. The user account table may include user security data, or may be linked to a security table 704 containing the user security information. The user security information may include fields such as an index 704a, a link ID 704b, salt values 704c, hash codes 704d, character count values 704e, and context selection criterion 704f. The index 704a may be used to identify individual records in the security table 704, and the linkID 704b may be used to link corresponding records to a record in the account table 702. The salt values 704c are required if salt values are used in the cryptographic hashing of the security strings. The hash codes 704d are the results of hash functions performed on the concatenation of the values in the full security string/substrings column 502 with the respect salt values 704c. The salt values 704c and hash codes 704d in FIG. 7 are examples only and have been truncated to enhance the visual aesthetics of FIG. 7. The character count values 704e correspond with the respective values in the character count column 506. The context selection criterion 704f represent relative values corresponding to a current context in which a client 602 is requesting access. For example, if the current context is associated with a busy area, or a previously unvisited location, the user may be required to provide a larger security substring to gain access to their account. Conversely, if the context indicates that the user is conforming to existing usage patterns, or is in a private location, a smaller security substring may enable verification.

A hash code 704d may be a result of performing a cryptographic hash function such as SHA256 on a substring and a salt. For example, is the substring is the 8 character string "Ju3Tou2 W" (e.g., as indicated in the full security string/substrings column 502), and the corresponding salt value 704c is "4ece73a9bcbf066e" (e.g., see record index 48 in FIG. 7), then the corresponding hash function is:

hash code=SHA256(salt||*Ju3Tou2W*)

where || is a concatenation operation.

The value of the hash code 704d in the user security table in FIG. 7 is truncated for visual aesthetic purposes. The salt value 704c is an example including a random hexadecimal number, but salt values may include other data values. The salt value 704c and the SHA256 cryptographic hash function are examples only as other salting values and cryptographic algorithms may be used.

Figure 8:
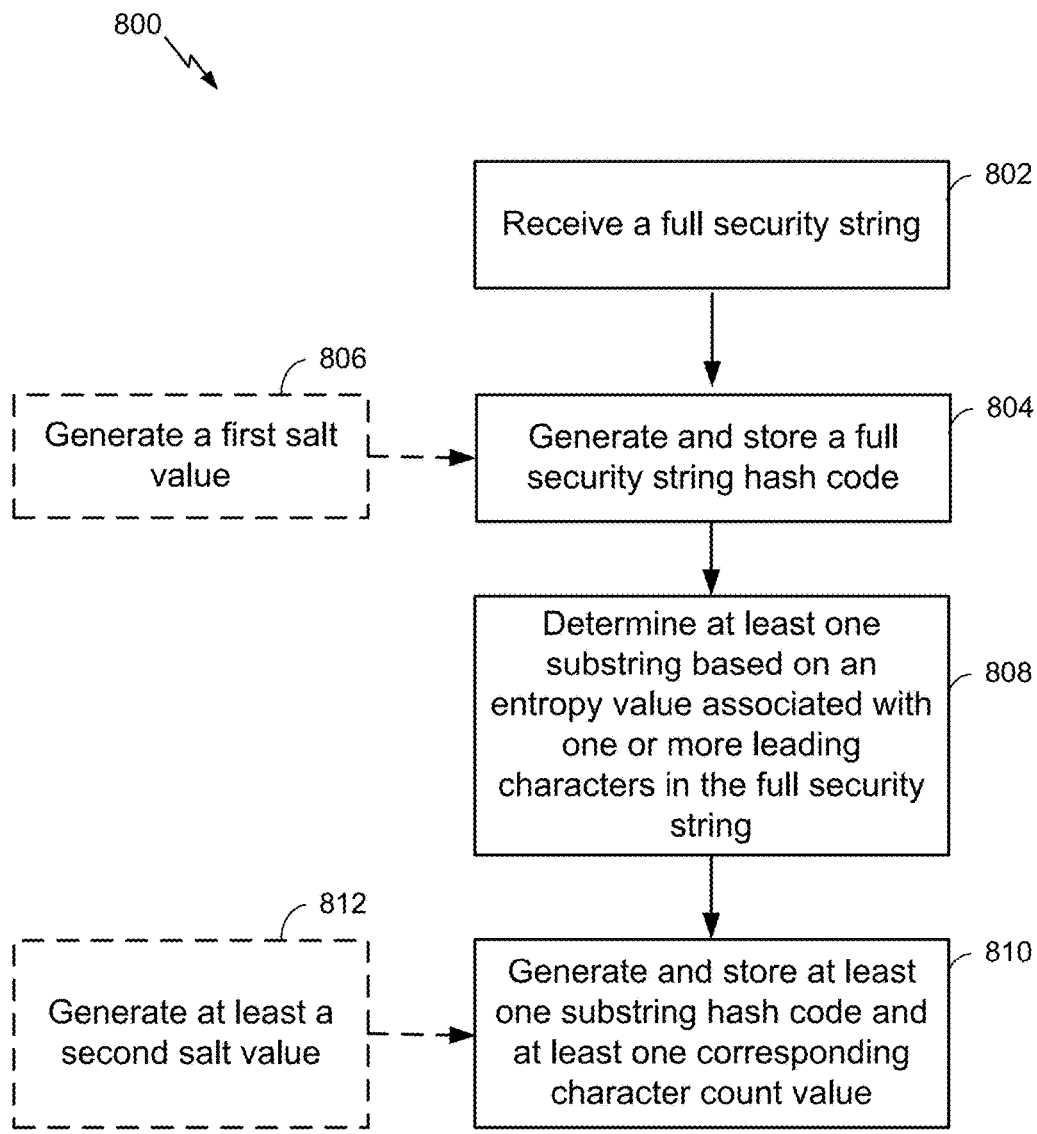
FIG. 8 is a block flow diagram of a process of generating a substring hash code.

Referring to FIG. 8, with further reference to FIGS. 1-7, a process 800 for generating a substring has code includes the stages shown. The process 800 is, however, an example only and not limiting. The process 800 can be altered, e.g., by having stages added, removed, rearranged, combined, and/or performed concurrently. For example, generating first and/or second salt values is optional and the corresponding stages are depicted with dashed lines in FIG. 8. The process 800 may execute on the server 202 for client-server applications (e.g., remote login), or locally on the mobile device 100 (e.g., local authentication).

At stage 802, the server 202 is configured to receive a full security string. The full security string may be entered into a mobile device 100 and provided to the server via the network 210. The mobile device 100 may also be configured to receive a full security string. The server 202 and mobile device 100 are means for receiving a full security string. The full security string is a relatively lengthy security credential a user may enter into a computing device such as a password, passphrase, gestures, or other information. As indicated on FIG. 5, an example of a full security string of 21 characters in length is the string "Ju3Tou2Wang3Ming2Yue4." Other lengths and elements may be used such as persistent data corresponding to gesture inputs (e.g., ASCII, Hexadecimal, and/or binary representations gesture inputs).

At stage 804, an authentication module 322 on the server 202 is configured to generate and store a full security string hash code based on the full security string. The full security string hash code may be stored in the access control database 204. For local authentication, the authentication module 144 and the trusted environment 160 on the mobile device 100 may also be configured to generate and store a full security hash code. The server 202 or the mobile device 100 may be means for generating and storing a full security hash code. The full security string hash code may include a salt value generated at stage 806. The salt value is optional but is generally recommended to frustrate attacks using lookup tables and rainbow tables. Any value may be used as a salt, but a preferred solution is to use a cryptographically secure pseudo-random number generator (e.g., java.security.SecureRandom for Java, system.security.cryptography.RNGCyptoServiceProvider for MS dot NET, CryptGenRandom for C/C++). The salt may be concatenated with the full security string value received at stage 802 (e.g., prepend, append). The full security string hash code is the result of executing a cryptographic hash function on the full security string and the concatenated salt if present. Examples of cryptographic hash functions include SHA256, SHA512, RipeMD, Whirlpool. Other cryptographic hash functions may also be used. The resulting full security hash code is stored in memory, such as the access control database 204. For example, the full security hash code and the optional salt value may be stored in a security table 704 that is associated with a particular user (e.g., a record in the account table 702). Other data structures may also be used to associate the full string hash code with a user.

At stage 808, the authentication module 322 on the server 202 is configured to determine at least one substring based on an entropy value associated with one or more leading characters in the full security string. For local authentication, the authentication module 144 and the trusted environment 160 on the mobile device 100 may also be configured to determine at least one substring based on an entropy value associated with one or more leading characters in the full security string. The server 202 or the mobile device 100 may be a means for determining at least one substring based on an entropy value associated with one or more leading characters in the full security string. The entropy of first 'x' characters in the full security string may be evaluated on a character by character basis until a sufficiently strong level substring is realized. The requirements of sufficiently strong may be based on network security design requirements. Referring to FIG. 5A, the complexity column 504 provides a relative indication of entropy complexity level or strength level (e.g., weak, good, strong, very strong) and a sufficiently strong substring may correspond to values of good, strong, or very strong based on design requirements. Off-the-shelf strength meter algorithms may be used to determine the complexity level of a string. In an example, the string 'Ju3Tou2 W' is considered a sufficiently strong substring because it has entropy corresponding to a complexity value of 'strong.' The substring 'Ju3Tou2 W' is the 8 leading characters in the full security string "Ju3Tou2Wang3Ming2Yue4." Thus, in this example, the substring 'Ju3Tou2 W' is determined to be at least one substring based on an entropy value associated with one or more leading characters in the full security string.

At stage 810, the authentication module 322 on the server 202 is configured generate and store at least one substring hash code and at least one corresponding character count value. For local authentication, the authentication module 144 and the trusted environment 160 on the mobile device 100 may also be configured to generate and store at least one substring hash code and at least one corresponding character count value. The server 202 or the mobile device 100 may be a means for generating and storing at least one substring hash code and at least one corresponding character count value. Continuing the example above, the substring 'Ju3Tou2 W' and an optional salt value (generated at stage 812) may be used to create a substring hash code (e.g., via a cryptographic hash function as previously described). As depicted in FIG. 7, the substring hash code, the corresponding character count value, and the optional salt value may be stored in the security table 704 (i.e., 704c, 704d, 704e). In local authentication embodiment, the security table 704 may persist in a trusted environment 160 on a mobile device.

Figure 9:
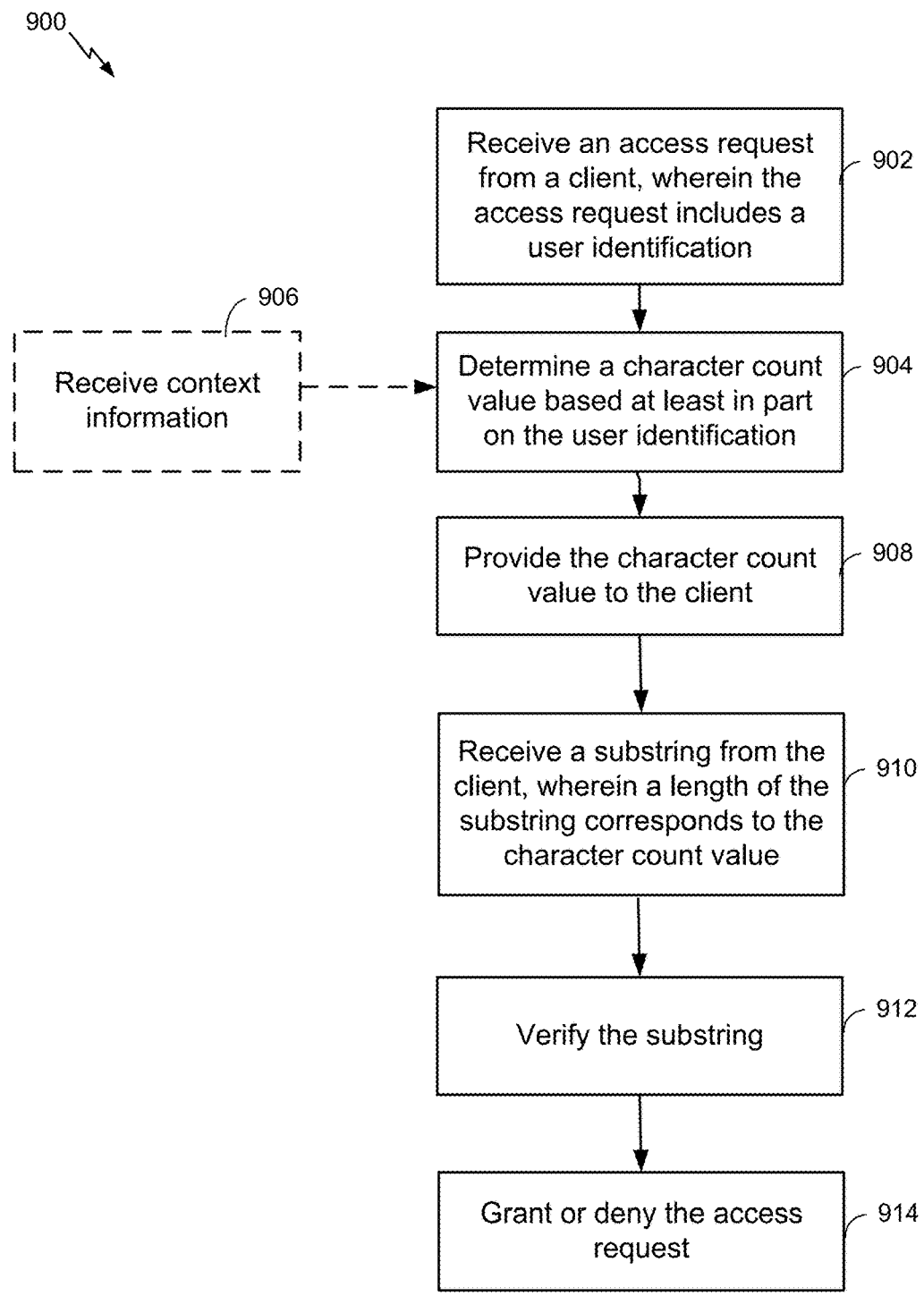
FIG. 9 is a block flow diagram of a process for accelerated passphrase verification on a server.

Referring to FIG. 9, with further reference to FIGS. 1-7, a process 900 for accelerated passphrase verification on a server includes the stages shown. The process 900 is, however, an example only and not limiting. The process 900 can be altered, e.g., by having stages added, removed, rearranged, combined, and/or performed concurrently. For example, receiving context information is optional and thus stage 906 is depicted with dashed lines.

At stage 902, the access controller 324 on a server 604 is configured to receive an access request from a client 602, such that the access request includes a user identification. In an example, the client 602 is a mobile device 100 and the access request is received via the network 210. The server 604 is a means for receiving an access request from a client. The user identification may be based on a user name selected by a user, or it may be associated with a particular client device (e.g., network interface controller (NIC), subscriber identification module (SIM), or other unique key). The client 602 may desire to access information on the content database 206 and the server 202 is configured to verify the client's credentials based on previously provided information such as a security passphrase. The user identification is used to associate the security credentials to the specific client/user.

At optional stage 906, the context evaluator 326 on the server 604 is configured to receive context information. The context information may be location information (e.g., the current location of a mobile device), or other contemporaneous environmental information such as ambient noise captured via a microphone on the mobile device 100. The context information may be the time the access request is received at stage 902, and the context evaluator 326 is configured to compare the time with data files corresponding to use histories and prior behavior of the client. The context evaluator 326 may assign context selection criterion 704f corresponding to a current context in which a client 602 is requesting access. The context selection criterion 704f may be an integer value, or other data types, to indicate a relative scale of the security needs associated with the context. As depicted in FIG. 7, the security table 704 indicates that a high context selection criterion 704f (e.g., a value of 10) requires entry of a full security string to validate a user, while a lower context selection criterion 704f (e.g., a value of 7) requires only the first 8 characters of the full security string (e.g., a substring) to be entered to validate a user. In an embodiment, the access control database 204 may only contain two security strings for a client (i.e., a full security string and a single substring). If context information is received by the server 604, it may be used to determine whether the full security string or the substring are required (i.e., only two context selection criteria values are required). The context selection may be based on one or more factors such as location and time, or time and history (i.e., to detect multiple attempts to access an account). Other combinations of environmental and behavior factors may be used to determine a current context value. The context evaluator 326 on the server 604 is a means for determining a current context value.

At stage 904, the access controller 324 in the server 604 is configured to determine a character count value based at least in part on the user identification information received at stage 902. The access control database 204 on the server 604 is a means for determining a character count value. The server 604 may utilize the user identification and optional context selection criterion to query the access control database 204 (e.g., via stored procedures or other data access commands) to determine the character count value. The character count values 704e are the number of characters in the corresponding substrings (e.g., FIG. 5A, the first 'x' characters). If only the full security string and a single substring are associated with a user, the character count for the substring is selected and provided to the client at stage 908. For example, the client may receive a character count information message 618 via the network 210.

At stage 910, the access controller 324 on the server 604 is configured to receive a substring from the client, such that the length of the substring corresponds to the character count value. The access controller 324 is a means for receiving a substring from the client. The client may send a substring message 620 which includes a substring of the corresponding length. Continuing the example discussed above, if the server 604 provided a character count value of '8' at stage 908, the client 602 may include the substring 'Ju3Tou2 W' in the substring message 620.

At stage 912, the access controller 324 on the server 604 is configured to verify the substring received at stage 910. The access controller 324 is a means for verifying the substring. The received substring may be combined with a previously stored salt value (e.g., 704c) and a cryptographic hash code may be determined. The resulting hash code is compared to the respective record in the access control database 204 (e.g., 704d). If the hash codes match, then the substring is valid and the access request is granted at stage 914. If the hash codes do not match, then the substring is invalid and the access request is denied at stage 914. The functionality of the server 604 based on the granted or denied results of the validation may vary based on applications. In an example, after a failed validation, the server 604 may be configured to ask the user to make one or more additional attempts based on the character count value, and then may request the user to enter a full security string on subsequent attempts.

Figure 10:
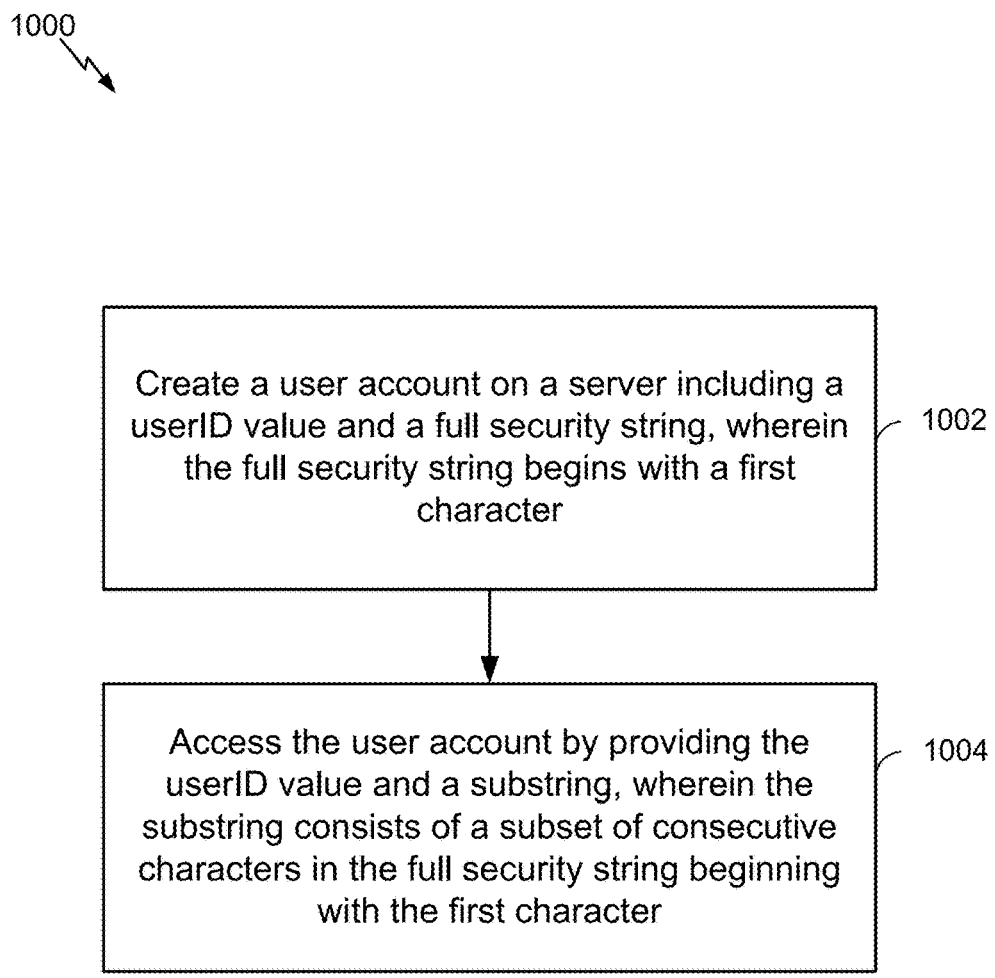
FIG. 10 is a block flow diagram of a process for accelerated passphrase verification on a client.

Referring to FIG. 10, with further reference to FIGS. 1-7, a process 1000 for accelerated passphrase verification on a client includes the stages shown. The process 1000 is, however, an example only and not limiting. The process 1000 can be altered, e.g., by having stages added, removed, rearranged, combined, and/or performed concurrently. A client 602, such as a mobile device 100, is a means for executing the process 1000.

At stage 1002, a mobile device 100 is configured to create a user account on a server including a userID value and a full security string, such that the full security string begins with a first character. The userID value may be a string entered by, or provided to, a user (e.g., an email address or other unique identifier). The userID may be a system variable such as a NIC or SIM value. The full security string may be a relatively lengthy string of sequential characters or other data (e.g., persistent data corresponding to gesture inputs). The sequence begins with a first character. For example, the full security string "Ju3Tou2Wang3Ming2Yue4" provided in FIG. 5 begins with the first character 'J.' The full security string may be provided via touch screen display 151 by the user, or via other types of input devices.

At stage 1004, the mobile device 100 is configured access the user account by providing the userID value and a substring, such that the substring consists of a subset of consecutive characters in the full security string beginning with the first character. A user may subsequently attempt to access the user account created at stage 1002 by providing the appropriate security credentials. The userID is provided by typing it into an appropriate data object, or it may be provided passively based on a hardware configuration (e.g., NIC, SIM). The user may then begin to enter the full security string they provided at stage 1002. Continuing the example above, the user enters the first character 'J' into an appropriate data object (e.g., text box object 153) and continues with the consecutive characters. That is, the substring provided by the user is 'J' followed by 'u' followed by '3' followed by 'T' followed by 'o' followed by 'u' followed by '2' followed by 'W,' etc. . . . . . At any point in this process after entering at least the first character 'J,' but before entering the full security string, the user's credentials are validated or rejected. The number of characters in the substring to be entered is not known by the user. As discussed above, the number of characters in the substring may vary based on the previously evaluated entropy (i.e., strength) of a substring. In an embodiment, the current context of the mobile device may also be used to determine the length of the substring. Thus, via the process 1000, an accelerated passphrase validation is realized by the mobile device.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 300) may be used to perform methods in accordance with the disclosure. Some or all of the procedures of such methods may be performed by the computer system 300 in response to processor 310 executing one or more sequences of one or more instructions (which might be incorporated into the operating system 340 and/or other code, such as an application programs 345) contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer-readable medium," as used herein, refer to any medium that participates in providing data that causes a machine to operate in a specific fashion. In an embodiment implemented using the mobile device 100 and/or the computer system 300, various computer-readable media might be involved in providing instructions/code to processor(s) 111, 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 325. Volatile media include, without limitation, dynamic memory, such as the working memory 140, 335. Transmission media include, without limitation, coaxial cables, copper wire and fiber optics, including the wires that comprise the bus 101, 305, as well as the various components of the communications subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the mobile device 100 and/or computer system 300. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for validating a user's security credentials on a computing device, the method comprising:
creating a user account on the computing device using an authentication module of the computing device and using a user identification value and a full security string, wherein the full security string begins with a first character, and wherein creating the user account further comprises generating account information by
generating a plurality of substrings of the full security string beginning with the first character by incrementally adding a character to the substring until an entropy value associated with the substring meets or exceeds a threshold value associated with a context of the computing device, wherein the context can be a location, time, geographic place or any combination of these,
associating each substring with a password strength value, a character count value, and the context in which the substring can be used in place of the full security string, and
storing the account information in a trusted execution environment of the computing device;
subsequently accessing the user account by:
providing the user identification value to the authentication module;
determining a current context of the computing device;
receiving a character count value from the authentication module associated with the user identification value, wherein the character count value corresponds to a password strength based on the current context of the computing device, and wherein the character count value is not disclosed to a user of the mobile device;
receiving an input from the user, wherein the input consists of a subset of consecutive characters in the full security string beginning with the first character;
providing the input to the authentication module when a number of characters in the input is equal to the character count value without disclosing to the user that the input has been provided to the authentication module;
allowing the user to continue to input characters of the full security string;
displaying an indication, from the authentication module, that the input has been validated before the full security string has been entered by the user; and
accessing requested content through the user account.

2. The method of claim 1 wherein the current context includes a current location of the client.

3. The method of claim 1 wherein the current context includes a time the access request is received.

4. The method of claim 1 wherein verifying the input substring includes determining a substring hash code for the input.

5. The method of claim 4 further comprising:
determining a salt value based at least in part on the user identification value; and
combining the input with the salt value, wherein a substring hash code is determined for the combination of the input and the salt value.

6. An apparatus comprising:
a memory;
at least one processor operationally coupled to the memory and configured to:
create a user account on the apparatus using an authentication module of the apparatus and using a user identification value and a full security string, wherein the full security string begins with a first character, wherein the processor is further configured to create account information, and wherein the processor is further configured to
generate a plurality of substrings of the full security string beginning with the first character by incrementally adding a character until an entropy value associated with the substring meets or exceeds a threshold value associated with a context, wherein the context can be a location, time, geographic place or any combination of these,
associate each substring with a password strength value, a character count value, and the context in which the substring can be used in place of the full security string, and
store the account information in a trusted execution environment of the apparatus;
and
access the user account, wherein the processor is configured to
provide the user identification value to the authentication module;
determine a current context of the computing device;
receive a character count value from the authentication module associated with the user identification value, wherein the character count value corresponds to a password strength based on the current context of the computing device, and wherein the character count value is not disclosed to a user of the mobile device:
receive an input from the user, wherein the input consists of a subset of consecutive characters in the full security string beginning with the first character;
provide the input to the authentication module when a number of characters in the input is equal to the character count value without disclosing to the user that the substring has been provided to the authentication module;
allow the user to continue to input characters of the full security string;
display an indication, from the authentication module, that the input has been validated before the full security string has been entered by the user; and
access requested content through the user account.

7. The apparatus of claim 6 wherein the at least one processor is configured to:
generate a first salt value;
combine the first salt value with the full security string; and
generate a full security string hash code based on the combination of the first salt value and the full security string.

8. The apparatus of claim 6 wherein the at least on processor is configured to:
generate a second salt value;
combine the second salt value with at least one substring of the plurality of substrings; and generate the at least one substring hash code based on the combination of the second salt value and the at least one substring.

9. The apparatus of claim 6 wherein the full security string comprises persistent data corresponding to gesture inputs.

10. The apparatus of claim 6 wherein the at least one processor is configured to perform a cryptographic hash on the full security string to generate a full security string hash code.

11. The apparatus of claim 6 wherein the at least one processor is configured to perform a cryptographic hash on at least one substring to generate at least one substring hash code.

12. The apparatus of claim 6 wherein the entropy value for each at least one substring of the plurality of substrings is evaluated as a complexity level that is less than a complexity level for an entropy value of the full security string.

13. The apparatus of claim 6 wherein the context includes a current location of the apparatus.

14. The apparatus of claim 6 wherein the context includes a current time.

15. A computing device comprising:
   means for creating a user account on the computing device using an authentication module of the computing device and using a user identification value and a full security string, wherein the full security string begins with a first character, and wherein creating the user account further comprises generating account information, the means for creating the user account comprising
      means for generating a plurality of substrings of the full security string beginning with the first character by incrementally adding a character to the substring until an entropy value associated with the substring meets or exceeds a threshold value associated with a context of the computing device, wherein the context can be a location, time, geographic place or any combination of these,
      means for associating each substring with a password strength value, a character count value, and the context in which the substring can be used in place of the full security string, and
      means for storing the account information in a trusted execution environment of the computing device; and
   means for subsequently accessing the user account comprising:
      means for providing the user identification value to the authentication module;
         means for determining a current context of the computing device;
      means for receiving a character count value from the authentication module associated with the user identification value, wherein the character count value corresponds to a password strength based on the current context of the computing device, and wherein the character count value is not disclosed to a user of the mobile device;
      means for receiving an input from the user, wherein the input consists of a subset of consecutive characters in the full security string beginning with the first character;
      means for providing the input to the authentication module when a number of characters in the input is equal to the character count value without disclosing to the user that the input has been provided to the authentication module;
      means for allowing the user to continue to input characters of the full security string;
      means for displaying an indication, from the authentication module, that the input has been validated before the full security string has been entered by the user; and
      means for accessing requested content through the user account.

16. A non-transitory, computer-readable medium, having stored thereon computer-readable instructions for validating a user's security credentials on a computing device, comprising instructions configured to cause the computing device to:
   create a user account on the computing device using an authentication module of the computing device and using a user identification value and a full security string, wherein the full security string begins with a first character, and wherein the instructions configured to cause the computing device to create the user account further comprise instructions configured to cause the computing device to
      generate a plurality of substrings of the full security string beginning with the first character by incrementally adding a character to the substring until an entropy value associated with the substring meets or exceeds a threshold value associated with a context of the computing device, wherein the context can be a location, time, geographic place or any combination of these,
      associate each substring with a password strength value, a character count value, and the context in which the substring can be used in place of the full security string, and
      store the account information in a trusted execution environment of the computing device;
   subsequently access the user account, wherein the instructions configured to cause the computing device to access the user account further comprise instructions configured to cause the computing device to:
      provide the user identification value to the authentication module;
      determine a current context of the computing device;
      receive a character count value from the authentication module associated with the user identification value, wherein the character count value corresponds to a password strength based on the current context of the computing device, and wherein the character count value is not disclosed to a user of the mobile device;
      receive an input from the user, wherein the input consists of a subset of consecutive characters in the full security string beginning with the first character;
      provide the input to the authentication module when a number of characters in the input is equal to the character count value without disclosing to the user that the input has been provided to the authentication module;
      allow the user to continue to input characters of the full security string;
      display an indication, from the authentication module, that the input has been validated before the full security string has been entered by the user; and
      access requested content through the user account.

* * * * *